United States Patent [19]
Stumpf et al.

[11] 3,942,022
[45] Mar. 2, 1976

[54] RAPID RESPONSE CORRELATION TYPE IMAGE MOTION SENSOR

[75] Inventors: Kenneth D. Stumpf, Chelmsford; John T. Watson, Lexington, both of Mass.

[73] Assignee: Itek Corporation, Lexington, Mass.

[22] Filed: Oct. 25, 1974

[21] Appl. No.: 518,014

[52] U.S. Cl.................................. 250/578; 178/6.8
[51] Int. Cl.².......................................... H01J 39/12
[58] Field of Search ............ 250/578, 203; 178/6.8, 178/7.1, DIG. 3, DIG. 33; 340/173 C; 307/221 C

[56] References Cited
UNITED STATES PATENTS

| | | | |
|---|---|---|---|
| 3,507,992 | 4/1970 | Foote............................ | 178/DIG. 33 |
| 3,603,729 | 9/1971 | Sperber............................... | 178/6.8 |
| 3,740,466 | 6/1973 | Marshall et al................ | 178/DIG. 3 |
| 3,823,261 | 7/1974 | Bolsey................................ | 250/203 |
| 3,836,710 | 9/1974 | Takahashi.................... | 178/DIG. 33 |
| 3,851,096 | 11/1974 | Collins et al.......................... | 178/6.8 |

Primary Examiner—Archie R. Borchelt
Assistant Examiner—D. C. Nelms
Attorney, Agent, or Firm—Homer O. Blair; Robert L. Nathans; Gerald H. Glanzman

[57] ABSTRACT

An improved system for detecting movement of an image formed by a reconnaissance optical system. A photodiode array is placed in the focal plane of the optical system to detect the image. The photodiode array is first read out at a time T into a shift register where the signal is stored. After passage of a time ΔT the photodiode array is read out a second time. The first and second read out signals are then correlated to determine the amount of movement of the image between times T and T + ΔT.

3 Claims, 2 Drawing Figures

RAPID RESPONSE CORRELATION TYPE IMAGE MOTION SENSOR

BACKGROUND OF THE INVENTION

The present invention relates generally to the field of detection of movement of a light pattern, and more particularly pertains to a new and improved system which enables the rapid detection of movement of a light pattern or image.

Systems for detecting movements of light patterns have been widely used in many fields, and particularly have been used in photographic and electronic cameras for detecting movement of the image within the camera. For the case of a photographic system the image movement is detected and then either the film or the camera is moved to compensate for the image movement such that a clear and sharp photographic image is formed.

Several types of systems have been utilized in the prior art to determine image motion. Some of these prior art systems are types in which radiation from a moving scene is imaged on a black and white reticle such that the image moves across the reticle. Light transmitted through the reticle is focused on a detector. In those systems the electrical output signal of the detector has a major frequency component dependent upon the speed of movement of the image across the reticle. A problem with this type of system is that the frequency is modulated also by image detail entering or leaving the grid area, and accordingly the system suffers a loss of accuracy. A second type of prior art system involves placing two spaced photodetectors in the moving image and measuring the time difference between the signals of the photodetectors. A problem with this system is that image details must actually move over the two detectors before the time difference can be measured, and accordingly the response time is rather slow. Another known system in the prior art involves utilizing a rotating mechanical scanner which first scans the image and simultaneously magnetically records the output signal. The image is then mechanically scanned a second time, and the second signal is correlated with the stored signal to determine image movement. A problem with this type of system is that the use of a mechanical scanner and a single photo cell makes the system slow, cumbersome, and unattractive from a reliability standpoint.

SUMMARY OF THE INVENTION

In accordance with a preferred embodiment, a system is disclosed for determining movement of a light pattern across an array of photodetectors. The array of photodetectors is first read out at a time T, and is read out a second time at a time $T + \Delta T$. The electrical signals resulting from the first and second read outs are then correlated to determine the shift between the signals, which is indicative of movement of the light pattern between times T and $T + \Delta T$.

One advantage the present invention enjoys over the prior art is that no form of mechanical scanning is required to determine image motion. Further the times T and $T + \Delta T$ may be chosen to be as close together as the response time of the photodetector array will allow, which enables a very rapid determination of image movement. This is a distinct advantage over prior art systems wherein the image must actually move over several photodetectors before image movement may be detected. The present invention was conceived particularly for use with an imaging system having a relatively long exposure time. With such a system, movement of the image must be rapidly detected and compensated so the image is not degraded by blur. Also, the present invention is an inherently simple system.

DESCRIPTION OF A PREFERRED EMBODIMENT

Figure 1:
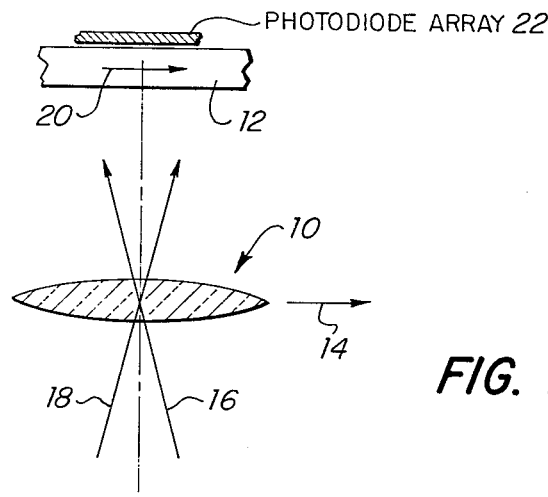
FIG. 1 illustrates broadly the type of problem which resulted in the present invention.

FIG. 1 illustrates broadly the problem which prompted the present invention. Referring to that figure there is illustrated an optical system 10 which images a scene it is viewing on a photographic film 12 located in the focal plane of the optical system. Assume now that the optical system 10 is mounted in an aircraft moving in the direction of arrow 14. An object on the ground which is ahead of the plane will first be imaged, as shown by arrow 16, on the film on the left side of the focal plane. However, as the plane travels over and passes that object its image moves to the right until it is finally imaged as shown by arrow 18. This simplified explanation shows that as the airplane is moving image details of particular objects on the ground are moving to the right as shown by arrow 20. In the prior art this image movement is detected and compensated for by moving either the film or the camera such that the image of each object remains in one particular position on the film, which results in a clear and sharp photograph. There are many other situations other than that depicted in FIG. 1 where it is desired to detect movement of an image or movement of a light pattern. According to the teachings of the present invention, a photodetector array 22 is placed in the focal plane as shown to enable detection of image motion.

Figure 2:
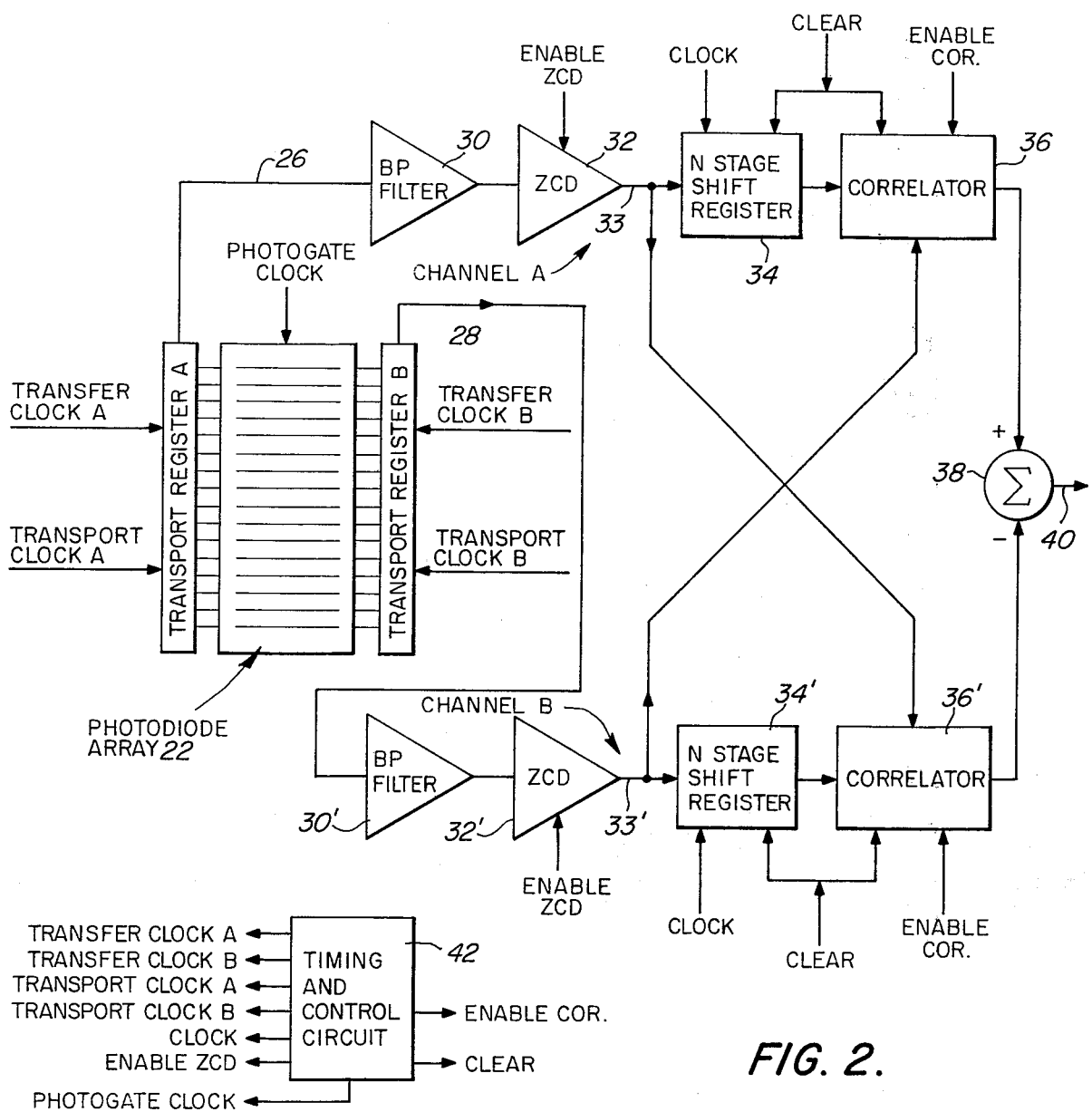
FIG. 2. shows a partial block diagram of one embodiment of the present invention.

Referring to FIG. 2, there is illustrated a block diagram of one embodiment of the invention. The photodetector array is illustrated as a photodiode array, which is one embodiment that can be purchased from Fairchild Semiconductor. The photodiode array may be read into either analog shift register A or analog shift register B. In a photodiode array, the amount of charge read out of each particular photodiode depends upon the intensity of the radiation impinging on that diode. The photodiode array and shift registers A and B are stepped by photogate clock pulses supplied to the array. A TRANSFER CLOCK command to either shift register A or B will cause that particular shift register to read out the charges currently in the photodiode array. A TRANSPORT CLOCK command to shift registers A and B will cause those registers to read out respectively on lines 26 and 28 the charges stored within them. The output of each of shift registers A and B is a series of current pulses with the position of each pulse defining the photodiode which caused the pulse and the amplitude of each pulse defining the amount of radiation incident upon that particular photodiode.

The illustrated embodiment operates broadly as follows. At time T a TRANSFER CLOCK command to register A causes it to read out the charges on the photodiode array. The charges are then left in storage in register A. At time $T + \Delta T$ the photodiode array 22 is read out again by a TRANSFER CLOCK command to register B. At this time register A has in it charges corresponding to the light image on photodiode array 22 at time T, and register B has in it charges corresponding to the light image on the array at time T + ΔT. TRANSPORT CLOCK commands are then directed to both registers A and B to cause them to read out the charges in sequence respectively into circuit channels A and B. These two channels are virtually identical, and accordingly the functions of the various circuits in each channel will only be explained once. The reference numerals used for channel A will also be used for channel B but with a prime notation. The output of each register is first directed into a bandpass filtering circuit 30 which allows only a smoothed AC portion of the original signal to pass. That smoothed AC signal is then directed to a circuit 32 which first amplifies the signal with an infinite gain amplifier, then clips the resulting amplified signal, and finally detects the zero crossovers of the clipped signal and produces an output on line 33. When the signal is amplified and clipped the resulting signal is a square wave having zero crossovers where the original smoothed AC signal from filter 30 had zero crossovers. If there were no movements of the image across photodiode array 22 or changes within the image from time T to time T + ΔT, the output signal on line 33 should be identical to and in synchronism with the signal on line 33'.

In essence, the remaining circuitry of FIG. 2 then correlates the signal on line 33 in channel A with the signal on line 33' in channel B. This is accomplished by feeding each signal into a shift register 34, the purpose of which is to introduce a slight time delay into each signal. The undelayed signal from channel B is then correlated with the delayed signal from channel A in a correlator circuit 36. Likewise, the undelayed signal from channel A is correlated with the delayed signal from channel B in a correlator circuit 36'.

If there were no movements of the image across photodiode array 22 or changes in the image, the signals from circuits 32 and 32' should be exactly equal and in synchronism. Accordingly, the outputs of correlators 36 and 36' should be exactly equal in amplitude but opposite in sign, and when summed in a circuit 38 the output on line 40 should be zero. However, if the image has moved slightly across photodiode array 22, then depending upon the direction of movement of the image, the signal on line 33 will be either slightly ahead or slightly behind the signal on line 33', and the outputs of correlators 36 and 36' will not be equal. The sign of the output from summing circuit 38 will then indicate the direction of movement of the image across photodiode array 22, and the magnitude of the output of circuit 44 will indicate the extent of movement of the image across the photodiode array.

One advantage of the present system for detecting movement of a light pattern is that it is an extremely fast system in that movement of the image across several adjacent photodetectors is not required. The time ΔT between the first and second read outs of the photodiode array is limited only by the detector integration time and the time required to clock the signal through the system, which in the present state of the art is approximately .1 millisecond. Accordingly, image motion may be detected approximately every millisecond and compensated for accordingly. This is much faster than any of the known prior art arrangements for detecting image motion.

The timing functions within the present circuit are controlled by a timing circuit 42 the details of which will not be explained as the circuit involves well known, art recognized technology.

While several embodiments have been described, the teachings of this invention will suggest many other embodiments to those skilled in the art.

We claim:

1. A system for determining movement of a light pattern and comprising:
   a. an array of photodetectors;
   b. means for forming said light pattern on said array of photodetectors;
   c. means for reading out said array of photodetectors at a time T to obtain a first electrical signal indicative of the light pattern on the photodetector array at time T;
   d. means for reading out said photodetector array at a time T + ΔT to obtain a second electrical signal indicative of the light pattern on the photodetector array at time T + ΔT; and
   e. means for correlating said first electrical signal at time T with said second electrical signal at time T + ΔT to determine relative time shift between the first and second signals, whereby the relative time shift between the signals is indicative of movement of the light pattern between time T and time T + ΔT.

2. A system as set forth in claim 1 wherein said array of photodetectors includes an array of photodiodes.

3. A system as set forth in claim 1 wherein:
   a. said means for reading out said photodetector array at time T includes a filtering circuit for obtaining a first smoothed AC output signal, a zero crossover circuit for determining zero crossovers within said first smoothed AC output signal and for obtaining a first zero crossover signal, and a storage means for storing said first zero crossover signal;
   b. said means for reading out said photodetector array at time T + ΔT includes a filter circuit for obtaining a second smoothed AC output signal, and a zero crossover circuit for determining zero crossovers within said second smoothed AC output signal and for obtaining a second zero crossover signal; and
   c. said correlating means includes means, coupled to said storage means, for delaying said first zero crossover signal to obtain a first delayed zero crossover signal, means coupled to said zero crossover circuit for producing said second zero crossover signal, for delaying said second zero crossover signal to obtain a second delayed zero crossover signal, means for correlating said first crossover signal with said second delayed zero crossover signal, and means for correlating said second crossover signal with said first delayed crossover signal.

* * * * *